July 5, 1949.  E. A. WINFIELD  2,474,879
INTERNAL-COMBUSTION ENGINE
Filed Oct. 2, 1945  4 Sheets-Sheet 3

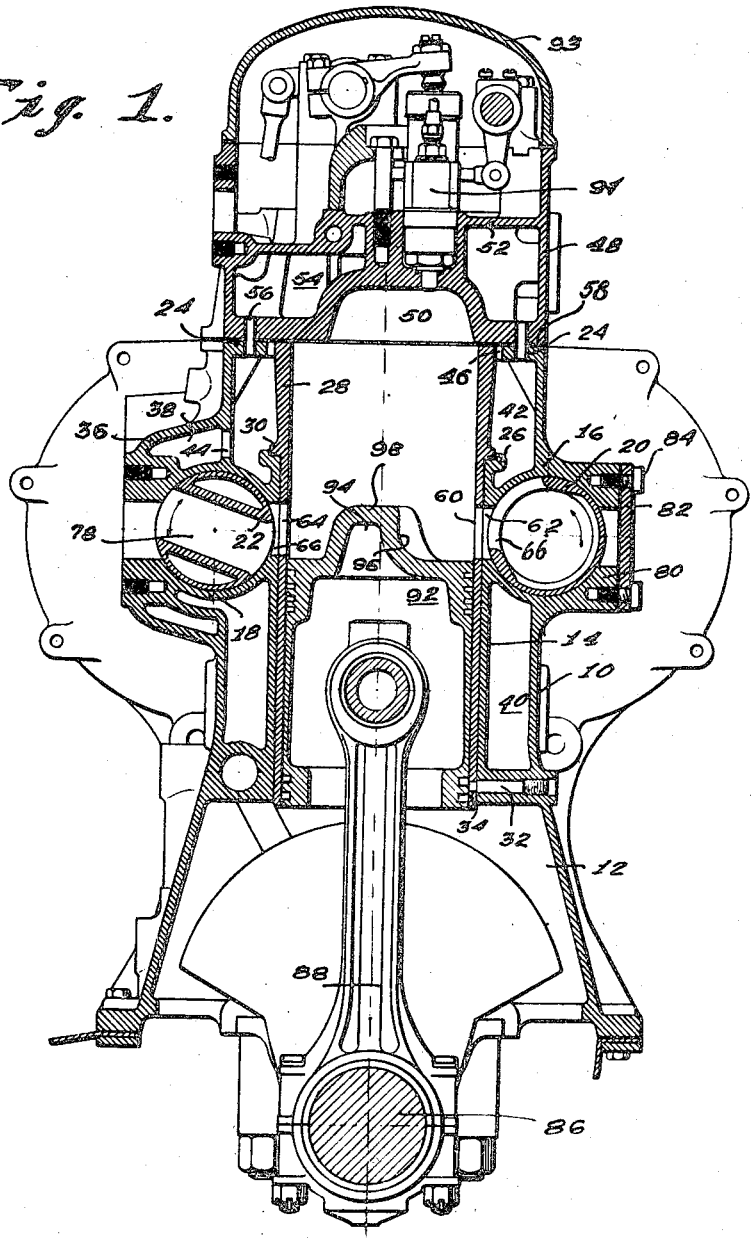

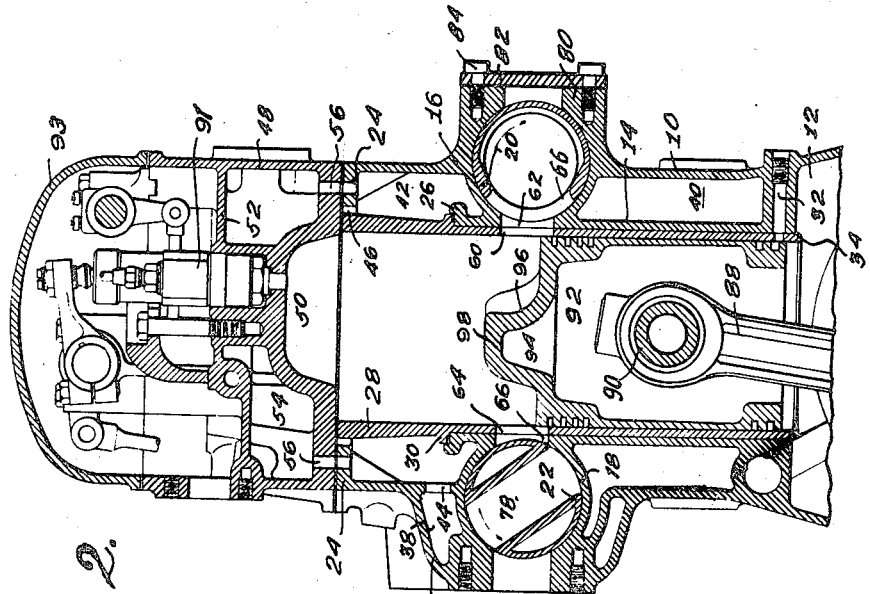
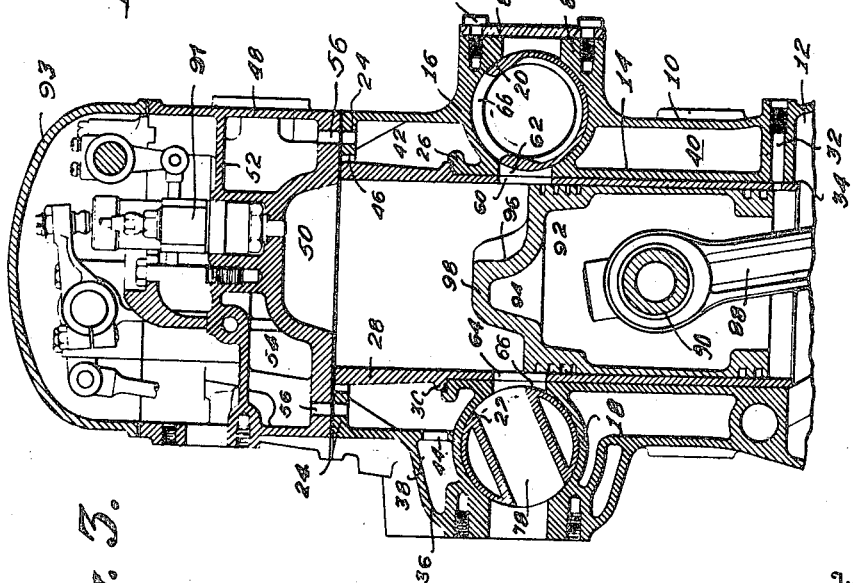

Inventor
Edward A. Winfield
By Strauch & Hoffman
Attorneys

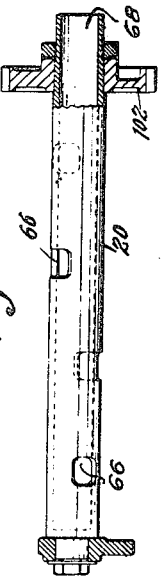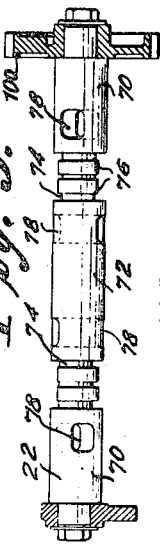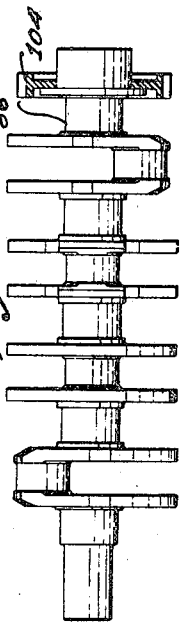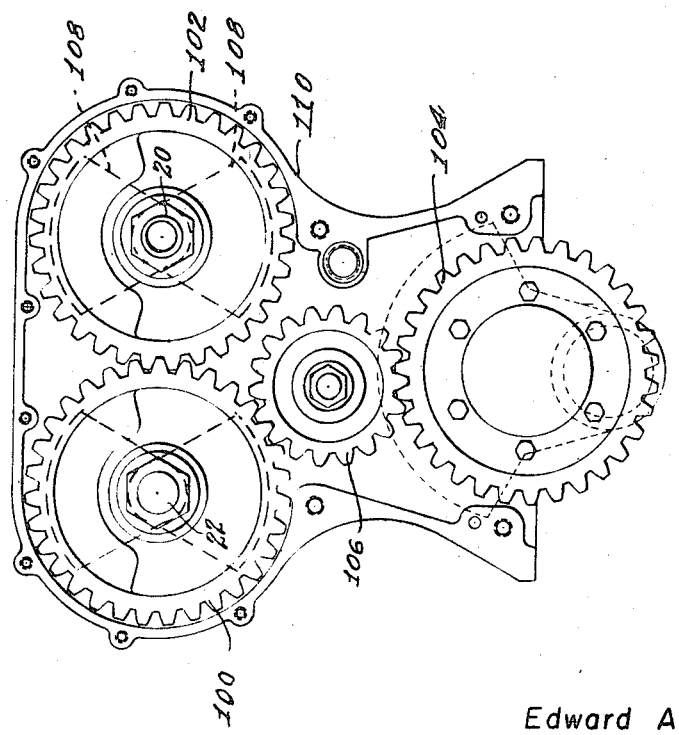

Patented July 5, 1949

2,474,879

UNITED STATES PATENT OFFICE 2,474,879

INTERNAL-COMBUSTION ENGINE

Edward A. Winfield, Los Angeles, Calif.

Application October 2, 1945, Serial No. 619,778

16 Claims. (Cl. 123—65)

My present invention relates to improvements in internal combustion engines. More particularly, my invention relates to improvements in engines of the two stroke or two cycle Diesel and spark ignition types, although certain aspects of the invention are applicable to engines of the four stroke or cycle type.

As the name implies, the two-stroke engine delivers twice as many power strokes in a given number of revolutions as the four-stroke engine, and assuming that the same power be delivered during each stroke, a two-stroke engine would deliver twice the power of a four-stroke engine of the same size. In addition, because of the delivery of twice the number of power strokes, a two-stroke engine theoretically has smoothness of torque of a four-stroke engine having twice as many cylinders. A further advantage of the two-stroke over the four-stroke engine resides in elimination of the idle stroke during which there is no gas pressure in the cylinder to counteract the inertia forces on the crankshaft bearings. Furthermore the reversal of stresses on the connecting rod bearings in a two-stroke engine is not so great as in a four-stroke engine. However despite these inherent advantages it has not been possible in the prior designs of two-stroke engines to obtain mean effective brake pressure comparable to that obtainable in four-stroke types and the efficiencies have been so low that two-stroke engines of the spark ignited types have heretofore been unable to effectively compete with the four-stroke engines.

The principal loss of power and efficiency in the prior two-stroke engines has been due to scavenging air losses through the exhaust ports which in the case of the two-stroke Diesel results in excessive consumption of power for scavenging and in spark ignited two-stroke engines results also is the loss of fuel especially when efforts are made to obtain high power outputs.

So far as I am aware, no prior two cycle engine has been developed in which the means effective brake pressure approaches that of a four-stroke engine and many costly prior efforts extending over many years have failed to solve the problem. After prior efforts and failures extending over the past twenty years, I have finally succeeded in providing a considerably improved and highly efficient two-stroke engine approaching the specific power output and mean effective brake pressure of a four-stroke engine, and for Diesel operation, I have provided an improved combustion chamber which provides lower specific fuel consumption and cleaner exhaust, and permits injection of the maximum amount of fuel that can be consumed by the air available for combustion by bringing the fuel into improved intimate turbulent contact with the air during injection.

A primary object of my present invention is to provide a novel valving and porting arrangement which materially improves the effectiveness of the power stroke of a two-stroke engine. This I accomplish by providing an exhaust arrangement in which the opening point of the exhaust is determined by the piston position and the closing determined by an independent valve; and an intake arrangement in which the opening is controlled by an independent valve and occurs after the piston uncovers the intake port and the cutoff is effected by the piston. In my invention the intake and outlet ports are covered and uncovered simultaneously by the piston.

In the most effective prior two-stroke engine known to me, the exhaust and intake ports are arranged in the cylinder wall so they are covered and uncovered at different times and the exhaust port is controlled entirely by the piston, while the opening of the intake port is delayed by an independent valve and the closing is controlled by the piston.

A further object of my improved porting and valving arrangement is the provision of an interval of intake opening after the exhaust port has closed which enables supercharging or filling the cylinder to a pressure higher than atmospheric or exhaust manifold pressure. This is accomplished by the simultaneous control of the intake and exhaust ports by the piston and use of the valve to close the exhaust before the piston covers the ports.

Another object of my invention is to provide an improved piston baffle which in the intake position of the piston effectively directs a scavenging flow through the cylinder to scavenge the cylinder without excessive loss of air out of the exhaust. During the injection period of Diesel fuel as the piston completes its compression stroke, the baffle shape is such as to create combined multiple direction whirling flows in the combustion chamber which at the same time form the inner combustion chamber wall. This creates considerably improved turbulence and intermingling and contact of the air and fuel, permitting maximum fuel injection and combustion without smoking. My improved piston baffle both directs the inflowing gases during the scavenging period, creates multiple directional turbulence, and forms a wall of a type of combustion chamber not only suitable for highly efficient Diesel operation, but which also provides highly desirable turbulence and very good detonation suppressing characteristics for two-stroke spark ignition engines.

Because of the crankpin spacing required to obtain equal intervals between power strokes in a two-stroke engine, rocking couples are introduced by the reciprocating pistons which cannot be balanced out by crank-shaft counter-weights. A further object of the present invention is to provide a novel rocking couple counter-balance arrangement. This I accomplish preferably by providing oppositely rotating shafts which, in addition to driving the engine exhaust and intake control valving, rotate counter-weights in opposite directions at crank-shaft speed, setting up a couple that effectively balances the reciprocating rocking couple.

Still another object of my invention is the provision of a novel simplified arrangement of cam operated fuel injection and valve shaft for Diesel engine operation. In the preferred bus engine embodiment of this arrangement hereinafter disclosed, the fuel injection cams are mounted on the exhaust valve shaft to permit intake of air endwise through the interior of a rotary intake valve, without use of an intake manifold. When an intake manifold is used the injector cams may be mounted on the intake valve shaft if desired.

A still further object of the invention is to provide universal engine arrangement, the parts of which may be readily assembled for right and left hand operation and for rotation in either direction.

Other objects of the invention will appear to those skilled in the art from the following detailed description of a preferred embodiment, and the scope of the appended claims.

In the accompanying drawings, wherein I have illustrated one practical example of the present invention, and in which similar reference characters designate corresponding parts throughout the several views:

Figure 1 is a vertical sectional view of a two stroke Diesel engine illustrating one embodiment of the invention and showing one of the engine pistons at its lower dead center position;

Figure 2 is a similar view with the piston about 35° past its lower center on the up stroke;

Figure 3 is a similar view with the piston approximately 45° before dead center on the down stroke;

Figure 7 is an end elevation showing the operating gearing for the intake and exhaust valves;

Figure 8 is an elevation partly in section on a reduced scale of the intake valve;

Figure 9 is a similar view of the exhaust valve;

Figure 10 is an elevation of the modified form of the intake valve for use in connection with an intake manifold, and Figure 11 is a detail elevation of the engine crank shaft.

Figure 5:
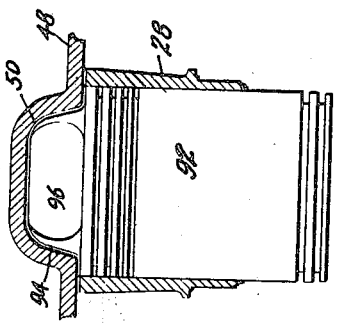
Figure 5 is a detail elevation of the engine piston looking at right angles to Figure 4 and the piston baffle disposed in the combustion chamber.

Referring in further detail of the drawings, the engine cylinder block, generally indicated at 10 includes a base portion 12 and a plurality of equidistantly spaced cylinders 14 integrally connected with each other and with the base 12. These cylinders are spaced from the opposite side walls of the block 10 and adjacent to their upper ends are integrally connected therewith by the horizontal cylindrical bearings 16 for the intake and exhaust valves respectively, which extend throughout the entire length of the cylinder block. The bores of these bearings are accurately finished to receive the rotatable intake valve 20 and exhaust valve 22, which will hereinafter be more fully described.

The upper ends of the block cylinders 14 terminate in spaced relation from the inwardly extending flanges 24 formed on the upper ends of the side walls of the block 10 and are provided with suitably formed seats 26 to respectively receive an externally formed flange 30 provided upon the wall of a piston cylinder 28. Below this flange the cylinder 28 fits closely within the block cylinder 14 and is securely held against vertical movement relative to the cylinder 14 by one or more dowel pins 32 threaded into the cylinder block and having their end portions fitting into openings 34 in the wall of the cylinder 28.

The side wall of the engine block 10 in which the exhaust valve 22 is mounted is formed with the boss 36 to which an exhaust manifold may be securely bolted. This boss is internally formed with the water circulating space 38 which connects the water space 40 between the side walls of the block and cylinder 14 below the intake and exhaust valves with the water space 42 above said valves through the opening 44.

The upper high compression end of the piston cylinder 28 gradually increases in thickness and has its top edge or surface flush with the upper surfaces of the side flanges 24 of the cylinder block and spaced from the inner edges of said flanges as indicated at 46 so that the water in the space 42 may have direct contact with the outer surface of this high compression end of the cylinder 28 to its extreme upper end. However, this feature is not claimed herein since it forms the subject matter of a separate application for patent filed August 17, 1945, Serial No. 610,938.

The cylinder head 48 is rigidly bolted to the upper end of the block 14 and is formed with a downwardly opening combustion chamber 50 in eccentric relation to the bore of the cylinder 28. The head 48 is formed with the internal horizontal wall 52 vertically spaced above the base wall of said cylinder head to provide the water receiving space 54 around the combustion chamber 50 which communicates with the water space 42 through the registering openings indicated at 56 in the base wall of the cylinder head and the flanges 24 at the upper end of the block 10. Suitable sealing gasket material indicated at 58 is interposed between these flanges and the base of the cylinder head 48.

Each cylinder 28 is provided with an intake port 60 which registers with a port or opening 62 of similar size and shape provided in the wall of the cylinder 14 of the engine block 10 and with which the intake valve 20 is associated. At the diametrically opposite side of cylinder 28 exhaust port 64 is provided therein registering with a port or opening 65 of similar size and shape in the wall of the cylinder 14 with which the exhaust valve 22 is associated.

Referring more particularly to Figure 8 of the drawings it will be noted that the intake valve 20 is of tubular form and is provided with a plurality of ports or openings 66 in the wall thereof corresponding in number to the number of engine cylinders and arranged in properly spaced relation to each other both axially and circumferentially of the valve. From reference to Figures 1 and 2 and 3 of the drawings it will be seen that the circumferential dimension of these ports is materially greater than that of the ports 60 and 62 in the cylinders 28 and 14 respectively. One end of the tubular valve member 20 is open as shown at 68 through which scavenging and combustion air is supplied at properly timed intervals to the cylinder 28.

The exhaust valve 22, as shown in Figure 9 is provided with tubular end portions 70 and a relatively long intermediate tubular portion 72, said tubular portion being connected by the shaft portions 74 of reduced diameter, each of which is formed with the cams 76 to actuate a fuel injector mechanism for the respective cylinders as will presently be more fully described. Each end portion 70 of the exhaust valve member and the intermediate portion 72 thereof at its opposite ends is formed with the diametrically extending exhaust passages 78 which also are arranged in properly spaced apart relation axially and circumferentially of the valve member to cooperate at the proper times with the exhaust ports 64 in the walls of the respective engine cylinders 28.

The wall of the bearing 16 for the intake valve 20 is formed with outwardly extending hollow bosses indicated at 80 in line with the respective valve ports to which an intake manifold may be connected for supplying air to the engine cylinders, when the alternative type of intake valve shown in Figure 10 is used and it is not desired to supply the air through the tubular valve member as shown in Figure 8. In the latter case the openings through the bosses 80 are closed by means of suitable cover plates 82 securely fixed thereto by the bolts 84 as shown in Figures 1, 2 and 3.

The engine crank shaft is journalled in suitable bearings on the base 12 of the engine block 10 and to each of the shaft cranks, the lower end of a piston rod 88 is rotatably connected in the usual manner. The upper end of the piston rod is connected by the wrist pin 90 to the hollow piston 92 reciprocating within cylinder 28. The upper end of the piston 92 is formed with a longitudinally protruding baffle 94 of generally crescent shaped form in plan having a concave side wall 96 opposed to the side of the cylinder 28 containing the intake port 60 and in substantial radial alignment therewith. This baffle has a flat top wall 98, Figures 1 to 3, smoothly merging at its edges into the side walls of the baffle and adapted to cooperate with the walls of the combustion chamber 50 to create a desired turbulence of the air and gas mixture therein as the piston approaches the end of its upward stroke, as will presently be more fully explained.

The fuel injecting mechanism, generally indicated at 91 which injects the fuel at properly timed intervals into the combustion chambers 50 of the respective engine cylinders is suitably mounted upon the wall 52 of the cylinder head 48 and enclosed within the cover 93. The specific injector mechanism constitutes no essential part of the present invention and may be of any approved type. As herein shown, this mechanism is actuated in properly timed relation to the movement of the engine pistons by means of the cams 76 on the rotary exhaust valve which coact with rollers 95 on the lower ends of operating rods 97 for the injector mechanisms, said rollers being yieldingly held in contact with the actuating cams by springs 99.

The valves 20 and 22 are continuously rotated in relatively opposite directions and at the same speed as the engine crank shaft by means of the gearing shown in Figure 7 of the drawings. Thus, at one end of the cylinder block directly meshing gears 100, 102 are suitably fixed to one end of the rotary valve shafts. Gear 104 fixed to end of the crank shaft 86 drives the idler gear 106 in mesh with the gear 100. By reason of the crank connections with the engine pistons in a two cycle engine, a reciprocating blocking couple is set up. However since the rotating valves are operated in opposite directions and at engine speed this reciprocating rocking couple may be balanced out by the use of suitable weights at opposite ends of shafts, said weights, as indicated at 108 in Figure 7 of the drawings, extending in opposite directions from the axis of the respective shafts. The gearing may be arranged at either end of the bank of cylinders in a suitable housing 110 attached thereto. Thus the parts may be assembled to rotate in either direction for right or left hand operation.

As shown in Figure 3 of the drawings with the intake and exhaust valves rotating in opposite directions, at approximately forty-five degrees before the lower dead center position, the exhaust through port 64 and passage 78 of the exhaust valve is partially opened while the port 66 of intake valve 20 is just commencing to open and supply scavenging air through said valve to the cylinder 28. In the continued rotation of the valves and the movement of the piston to the dead center position as shown in Figure 1, both valves are open and the scavenging air entering cylinder 28 through the port 60 is directed by the baffle 94 on the top of the piston upwardly and through the cylinder and combustion chamber so as to obtain a most efficient and thorough scavenging of the burned gas and air from the cylinder through port 64 and passage 78 of the exhaust valve 22. When the piston has moved upwardly approximately thirty-five degrees beyond the lower dead center as shown in Figure 2, the exhaust valve is just closing while the intake valve remains open so that the cylinder 28 can be supercharged or filled with intake air at any desired pressure above the atmospheric or exhaust pressure. It will thus be understood that there is a lap of about eighty degrees in which the intake and exhaust ports are open, which is sufficient to enable the cylinder to be scavenged of the burned gases and is of such duration that no substantial loss occurs through the exhaust port.

The piston baffle 98 has been so designed as to provide the best shape for directing the inflowing gases during the scavenging period and also to cooperate with the walls of the combustion chamber 50 in a manner best suited for the high efficiency operation of the engine.

It has been determined that this piston baffle provides a type of combustion chamber which can also be used with a spark ignition engine as well as an engine of the Diesel type, as it produces the necessary pattern of turbulence of the gaseous mixture for use in both types of engines and also has excellent detonation suppressing characteristics.

In the up stroke of the engine piston, injection begins at approximately fifteen degrees before the top dead center position and is completed at or slightly before the top center position under full load conditions. Under less than full loads, injection will be completed at variable degrees in advance of the top center position.

Combustion commences at the beginning of injection and is completed at the end of injection. In an engine of the spark ignition type combustion commences at the time the spark occurs and the end of the combustion period is not definitely controlled as in a Diesel engine.

Figure 6:
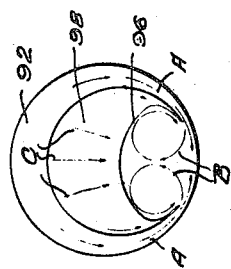
Figure 6 is a diagrammatic plan view illustrating the pattern of turbulence produced by the piston baffle within the combustion chamber.
Figure 4:
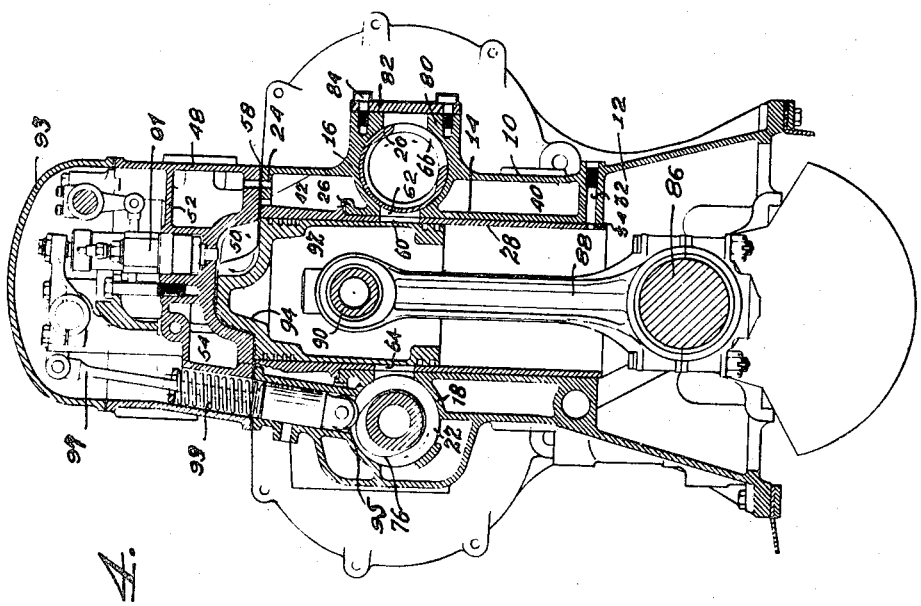
Figure 4 is a sectional view similar to Figure 1 showing the fuel injector operating cam on the exhaust valve shaft and the engine piston at its top dead center position.

The combustion chamber as shown in Figures 5 and 6 of the drawings has been designed to provide a definite pattern of controlled turbulence in the combustion chamber which will bring all of the air into intimate contact with the injected fuel during the injection period. As the piston approaches the top dead center position and the baffle 88 enters the chamber 50, a restricted space is formed between the baffle and the top and side walls of the combustion chamber. This results in flattened streams of air indicated by the arrows A being forced circumferentially from opposite sides of the baffle into the combustion space between the concave wall 96 of the baffle and the side wall of the combustion chamber, said air streams meeting at the approximate center of said combustion space and tending to form two separate whirls therein as indicated in Figure 6 by the arrows B. At the same time, air streams indicated by arrows C are forced horizontally over the top of the baffle and downwardly into the combustion space to meet the whirls B. Thus there are three major directions of air flow over and around the baffle and the combination of these air flows into which the fuel is injected forms the desired turbulence pattern of the air and fuel mixture within the combustion chamber.

In the operation of a Diesel engine, a correct mixture of gas and air is not necessary because the heat of compression is sufficiently high to burn the fuel as it is injected until all of the air has been burned, any excess of fuel being unburned. The power developed depends on the amount of heat liberated, which in turn depends upon the volume of fuel injected, and if a supercharge of air is provided, more power will be developed. By increasing the air supply, the development of power may be proportionately increased, up to the limit which the mechanical strength of the engine will permit with satisfactory cooling.

The extent to which the expansion of the burned fuel and air is utilized depends upon the point of which the exhaust port opens. In the present instance the exhaust port opens when approximately seventy-five per cent of the expansion stroke of the engine piston has been completed. The pressure in the cylinder 28 does not drop until the piston has traveled past the exhaust port 64. The rotary intake valve 20 delays opening of the intake port 60 until the pressure in the cylinder is equal to or less than the intake pressure, as will be understood from reference to Figure 3 of the drawings.

By the arrangement of rotary valves 20 and 22 and the intake and exhaust ports at the same horizontal level in diametrically opposed relation, it will be seen that the time of opening of the exhaust port is determined by the position of the piston in the engine cylinder and the closing of said port is determined by the rotary valve. On the other hand, the time of the opening of the intake port is controlled by the rotary valve which occurs after the piston uncovers the port and the closing of said port is determined by the position of the piston in the engine cylinder. This feature in connection with the novel type of combustion chamber above described results in lower fuel consumption, cleaner scavenging action and permits maximum brake mean effective pressures to be obtained in operation of the engine without smoky exhaust.

As is well known, in a two cycle engine, a power stroke of the piston occurs each time the piston reaches the top center position. Therefore there is twice the number of power strokes of the piston for a given number of revolutions of the crank shaft as in a four cycle engine. Assuming that the same power output is obtained on each piston stroke, it follows that in the two cycle engine, there is twice the power output in the same number of crank shaft revolutions as would be obtained in a four cycle engine. Accordingly, a four cylinder two cycle engine would have a power output which is the equivalent of an eight cylinder four cycle engine with approximately the same smoothness of torque. Therefore a smaller number of cylinders can be used in a two cycle engine and still have smooth torque characteristics in the operation thereof.

Also, since in the two cycle engine the idle piston stroke, when there is no gas pressure in the cylinders to offset the inertia forces on the bearings, is eliminated. Accordingly, reversal of stresses on the connecting rod bearings in a two cycle engine is reduced to a minimum. Heretofore in a two cycle engine of either the Diesel or spark ignition type it has not been possible to obtain substantially the same power output from each power stroke of the piston as in a four cycle engine, and the mean effective brake pressure was very low. Also excess power was consumed in the scavenging operation and in the Diesel engine part of the combustion air escaped through the exhaust, and a part of the fuel in the ignition type engine. Operating efficiency was therefore much below that of the four cycle engine.

For the several reasons above explained, these deficiencies of prior efforts to produce an efficient and economically operating two cycle engine have been overcome by means of the present invention which provides an engine of this type having a high brake mean effective pressure and power output which approaches that of the four cycle engine.

Other objects of the invention will appear to those skilled in the art from the following detailed description of a preferred embodiment, and the scope of the appended claims.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The method of operating an internal combustion engine embodying a cylinder having intake and exhaust ports in the cylinder wall which are covered and uncovered by a reciprocating piston together with independent exhaust and intake control valves which comprises the steps of actuating the valves with relation to the position of the piston in such manner that the opening of the exhaust is determined by the piston position and its closing is determined by the exhaust valve, while the intake opening occurs after the piston uncovers the intake port, and the intake cut-off is effected by the piston.

2. In an internal combustion engine, a cylinder provided in its cylindrical wall with intake and exhaust ports; a piston in said cylinder which covers and uncovers said ports in operation; an intake control valve; means for opening said intake control valve after the intake port is uncovered by said piston and for closing it after said intake port is covered by said piston; an exhaust control valve; and means for opening said exhaust control valve before said piston uncovers said exhaust port, and for closing it before said piston covers said exhaust port.

3. In an internal combustion engine embodying a cylinder having intake and exhaust ports in the cylinder wall which are substantially simultaneously covered and uncovered by a reciprocating piston and independent exhaust and intake control valves, the method of operation which comprises the steps of actuating the valves with relation to the position of the piston in such manner that the opening of the exhaust is determined by the piston position and its closing is determined by the exhaust valve, while the intake opening occurs after the piston uncovers the intake port, and the intake cut-off is effected by the piston, and injecting supercharging air through the intake port before the exhaust port is covered by the piston, but after it is closed by said valve.

4. In an internal combustion engine, a cylinder provided in its cylindrical wall with intake and exhaust ports, a piston in said cylinder which substantially simultaneously covers and uncovers said ports in operation; an intake control valve; means for opening said intake control valve after the intake port is uncovered by said piston and for closing it after said intake port is covered by said piston; an exhaust control valve; means for opening said exhaust control valve before said piston uncovers said exhaust port, and for closing it before said piston covers said port; and means for supercharging said cylinder.

5. In an internal combustion engine, a plurality of cylinders provided in their cylindrical walls with intake and exhaust ports; pistons in said cylinders which cover and uncover said ports in operation; a crankshaft driven by said pistons; an intake control valve for said intake ports; an exhaust control valve for said exhaust ports; drive shafts for said valves; and counter-balancing weights driven in opposite directions by said shafts at crankshaft speeds to counter-balance the rocking couple set up by said pistons in operation.

6. In an internal combustion engine, a cylinder bank comprising a plurality of cylinders provided in their cylindrical walls with intake and exhaust ports; pistons in said cylinders which cover and uncover said ports in operation; a crankshaft driven by said pistons; an intake control valve for said intake ports; an exhaust control valve for said exhaust ports; drive shafts for said valves; and a counter-balancing weight fixed to each valve at each end of said cylinder bank and driven in opposite directions by said shafts at crankshaft speeds to counter-balance the rocking couple set up by said pistons in operation.

7. In an internal combustion engine, a cylinder having intake and exhaust ports in the cylinder wall, a reciprocating piston adapted to cover and uncover said ports; independent rotary exhaust and intake control valves for said ports; an injector operating cam rotatable with one of said valves; and an injector mechanism for said cylinder actuated by said cam.

8. In an internal combustion engine, a plurality of cylinders provided in their cylindrical walls with intake and exhaust ports; pistons in said cylinders which cover and uncover said ports in operation; a crankshaft driven by said pistons; a hollow rotary intake control valve through which the intake gas is fed endwise to said intake ports; an exhaust control valve for said exhaust ports; an injector for each cylinder; and an injector actuating cam for each injector rotatable with said exhaust valve.

9. An internal combustion engine comprising a cylinder; substantially like oppositely disposed ports in the cylindrical wall of said cylinder; a reciprocating piston in said cylinder adapted to cover and uncover said ports simultaneously; a crankshaft driven by said piston; like control valve seats adjacent each of said ports; like connections for manifolds and cover plates to each of said valve seats; and intake and an exhaust control valve fitting into either of said seats; and mechanism selectively connectible with said valves at either end of the engine for driving the control valve in each seat at crankshaft speed; whereby the parts of said engine may be readily assembled for right and left hand operation and for rotation in either direction.

10. An internal combustion engine comprising a bank of cylinders; substantially like oppositely disposed ports in the cylindrical wall of each cylinder; a reciprocating piston in each cylinder adapted to cover and uncover said ports simultaneously; a crankshaft driven by said pistons; like control valve seats adjacent each of said ports; like connections for manifolds and cover plates to each of said valve seats; an intake and an exhaust control valve fitting into either of said seats; gearing connectible with said valves and including an idler gear adapted to be mounted on either end of the cylinder bank for driving the control valves in said seats at crankshaft speed in opposite directions; whereby the parts of said engine may be readily assembled for right or left hand operation and for rotation in either direction.

11. The combination defined in claim 2, in which said intake and exhaust ports are arranged relative to each other axially of the cylinder, to be simultaneously covered and uncovered in the reciprocation of the piston.

12. The combination defined in claim 2, in which said intake and exhaust ports are disposed in diametrically opposed relation in the cylinder wall.

13. In a two-cycle internal combustion engine, a cylinder having a combustion chamber at one end and diametrically opposed intake and exhaust ports in the cylinder wall spaced from said chamber, a reciprocating piston in said cylinder, intake and exhaust valves mounted to rotate about horizontal axes located in a common plane intersecting the centers of said intake and exhaust ports, each valve having a flow control port to cooperate with the intake and exhaust ports respectively in the cylinder wall, and means for constantly rotating said valves in one direction and in timed relation with the reciprocatory movements of the piston to control scavenging, exhaust and intake flows through said valve and cylinder ports as the latter ports are simultaneously covered and uncovered by the reciprocating piston.

14. The combination defined in claim 13, in which the control port of the intake valve has a greater effective area than the control port of the exhaust valve to supercharge the cylinder after the exhaust valve is closed.

15. In an internal combustion engine, a cylinder having an eccentric combustion chamber at one end and diametrically opposed inlet and outlet ports in the cylindrical wall thereof, intake and exhaust valves associated with the intake and exhaust ports respectively, a reciprocating piston in said cylinder having a baffle directing scavenging flow through the cylinder and combustion chamber when the ports are uncovered by said piston, means for operating said intake and exhaust valves to move the intake valve to open position after the cylinder intake port is covered by the piston and to move the exhaust valve to open position before the piston uncovers the cylinder exhaust port and to close said exhaust valve before the piston covers said exhaust port, said piston baffle and combustion chamber being constructed to cooperatively create a plurality of whirling flows of the gaseous fuel mixture in the combustion chamber about angularly related intersecting axes.

16. In an internal combustion engine, a cylinder having a combustion chamber at one end thereof, and a reciprocating piston in said cylinder having a baffle of general crescent shaped form protruding from the end of the piston into the combustion chamber during the compression stroke of the piston, said baffle having top and side walls cooperating with the chamber walls to create a plurality of individual whirling flows of the fuel mixture in intersecting paths within the combustion space.

EDWARD A. WINFIELD.

REFERENCES CITED

The following references are of record in the file of this patent:

UNITED STATES PATENTS

| Number | Name | Date |
|---|---|---|
| 748,011 | Remington | Dec. 29, 1903 |
| 874,920 | Altham | Dec. 31, 1907 |
| 1,176,951 | Fornaca | Mar. 28, 1916 |
| 1,450,567 | Tartrais | Apr. 3, 1923 |
| 1,481,795 | Ford | Jan. 29, 1924 |
| 1,745,884 | Barnaby | Feb. 4, 1930 |
| 1,983,198 | Steiger | Dec. 4, 1934 |
| 2,043,080 | Vincent | June 2, 1936 |
| 2,294,332 | Erickson | Aug. 25, 1942 |

FOREIGN PATENTS

| Number | Country | Date |
|---|---|---|
| 476,356 | England | 1937 |
| 493,727 | England | 1938 |
| 554,134 | England | 1943 |